United States Patent Office.

JOHN BRIGHTMAN HASKINS, OF BROOKLYN, NEW YORK.

Letters Patent No. 105,073, dated July 5, 1870.

IMPROVED MEDICAL COMPOUND.

The Schedule referred to in these Letters Patent and making part of the same

---

I, JOHN BRIGHTMAN HASKINS, of Brooklyn, Kings county, and State of New York, have invented a certain medical composition called "Golden-leaf Extract," of which the following is a specification.

The nature of my invention consists in combining five simple ingredients in proportionate quantities, which, on being properly treated and compounded, produce a safe, nutritious, and healing fluid extract, from the use of which, when taken at stated periods, beneficial results are obtained, the said extract being composed and of about the proportions following, viz:

First, one and one-fourth pound of buchu-leaf;
Second, one-fourth pound of sassafras-bark;
Third, one-fourth pound of the leaves of an herb found in American swamps, known as gold-thread;
Fourth, ten gallons of water; and
Fifth, three quarts of ninety-five per cent. proof alcohol.

The first three of these ingredients I put into a boiler containing ten gallons of soft water, and I boil the contents over a slow fire, in a close vessel, for twelve hours, or until the same is reduced to eight gallons, stirring up the contents of the boiler at intervals.

I now suffer the contents of the boiler to cool, and I next put into the combination so boiled and cooled off, three quarts of alcohol, of ninety-five per cent. proof, and agitate the whole compound, and finally I run the extract off into bottles, when my golden-leaf extract, is ready for use, and a wine glass of the extract, taken daily before meals, will soothe the pains of rheumatism, kidney disease, swollen joints, and nervous diseases, and effect a cure of the same in a few days, as can be proved from numerous successful experiments. Besides my gold-leaf extract will be found a good blood-purifier.

I claim as my invention—

The manufacture or preparation of a medical compound, which I denominate golden-leaf extract, of the ingredients, in the proportions, and for the purposes set forth.

In testimony whereof I have hereunto set my signature this 3d day of June, 1870.

JOHN BRIGHTMAN HASKINS.

Witnesses:
ARTHUR NEILL,
GEO. W. MADOX.